Patented Apr. 8, 1930

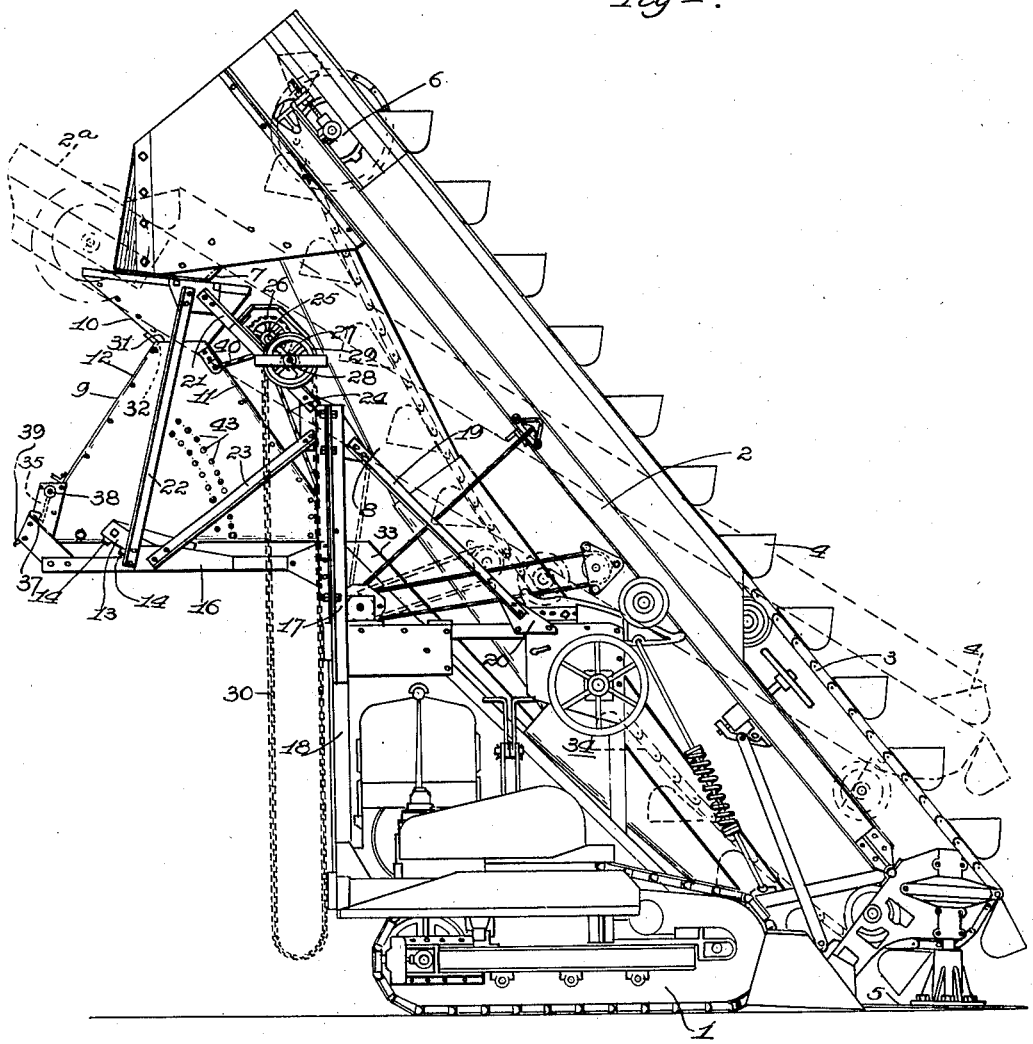

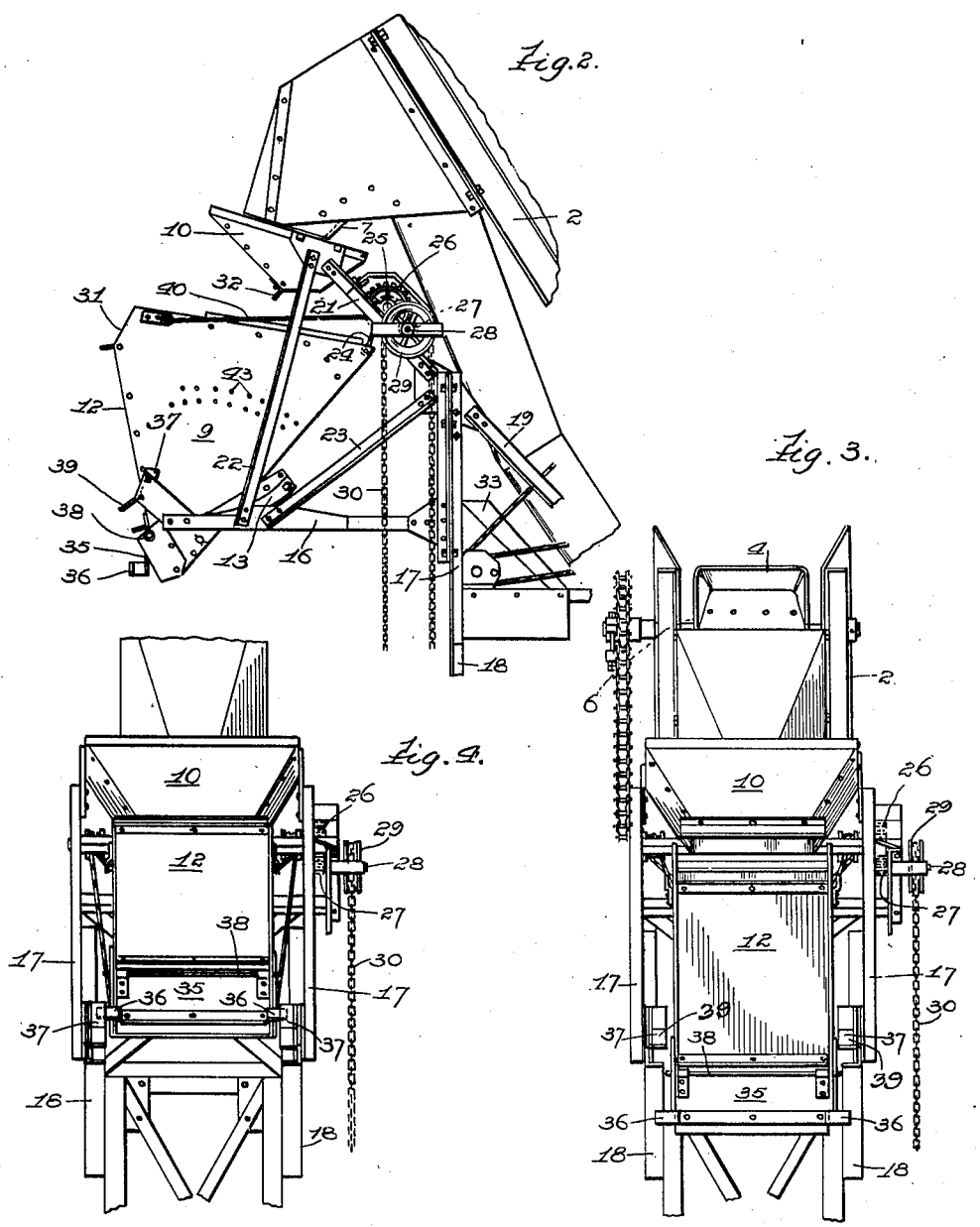

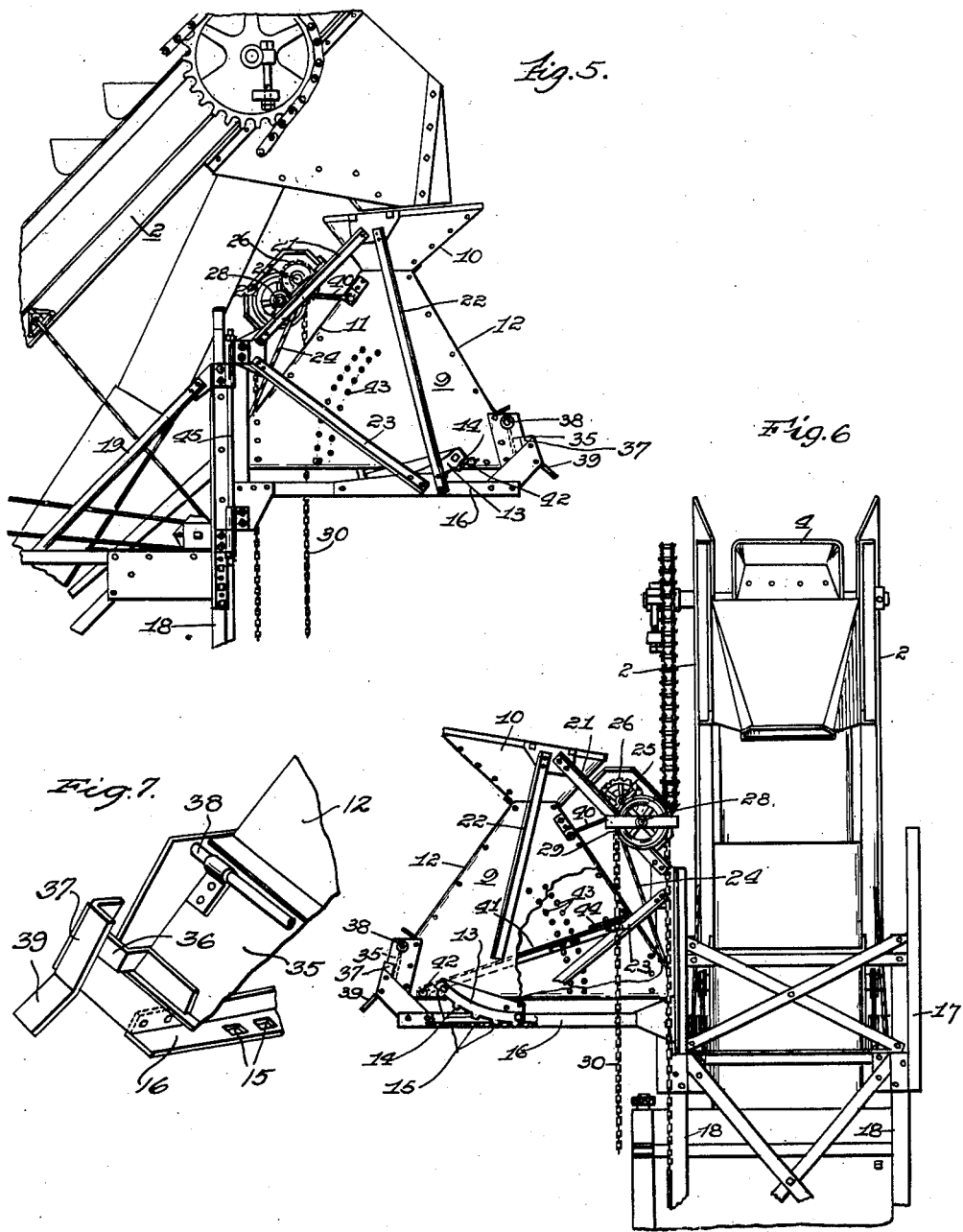

1,753,546

UNITED STATES PATENT OFFICE

HARRY H. BARBER, OF AURORA, ILLINOIS, ASSIGNOR TO BARBER-GREENE COMPANY, OF AURORA, ILLINOIS, A CORPORATION OF ILLINOIS

AUTOMATIC MEASURING HOPPER

Application filed July 16 1926. Serial No. 122,818.

This invention relates to a device for handling material such as sand, gravel, crushed stone or the like, and its purpose is to provide a receptacle for measuring a definite quantity of such material and discharging such quantity into a truck, bin or other receptacle for use. The invention consists of certain features and elements of construction in combination as herein shown and described and as indicated by the claims.

In the drawings:

Figure 1 is a side elevation of a material-loading machine fitted with a measuring hopper embodying this invention, and showing the hopper in receiving position.

Figure 2 is a side elevation of the hopper in discharging position showing only a fragment of the loader on which it is mounted.

Figure 3 is a rear elevation of the hopper as it appears in discharging position.

Figure 4 is a rear elevation showing the hopper returned to receiving position.

Figure 5 is a side elevation showing the upper portion of the loading machine and the opposite side of the measuring hopper from that shown in Figure 1.

Figure 6 is a rear elevation showing the hopper swung about its vertical pivot mounting for discharge at one side of the loader.

Figure 7 is a fragmentary perspective detail view of the locking means for the tail gate of the hopper.

For many uses of loose material such as sand, gravel or stone, it is important to measure the material accurately, especially when it is employed in mixing concrete to definite specifications. The purpose of limiting specifications is usually to prevent the addition of an excessive proportion of sand or gravel to the cement, but when an open hopper or measuring receptacle is used, it is likely to be heaped full with the sand or gravel with the result that too large a quantity of this material is dumped into the mixing machine, even though the specified or indicated number of hopper loads is not exceeded. In using any measuring receptacle, therefore, it is preferable to employ the so-called "strike off" principle by which a leveling blade is carried across the top of the receptacle to strike off any excess material heaped up therein and thus insure that a uniform quantity is added to the mixture each time the hopper is dumped.

My invention relates to a device of this character and for purposes of illustration I have shown it as associated with a bucket loader, though it may be understood it is equally well adapted for use in connection with a fixed storage bin or with any other source of material supply.

Referring first to Figure 1, the loading machine is shown mounted on a crawler tractor, 1, and comprises a boom, 2, upon which an endless chain, 3, is mounted for carrying buckets, 4, upwardly along an inclined path for elevating material from the lower end to the upper end of the boom. At the lower end this particular machine is fitted with horizontally rotating feed disks, 5, which serve to gather loose material from a pile so as to collect it in the path of the buckets, 4, which then transfer the material upwardly and dump it as they pass around the head wheels, 6. A short discharge chute, 7, directs the material as it falls from the buckets, 4; while the empty buckets return downwardly over spillage troughs, 8, by which any material which clings to the buckets while they are rounding the head wheels, 6, and then subsequently drops off, is carried to the lower end of the machine to be picked up by the disks, 5, and again fed into the buckets, 4.

The measuring hopper consists of a receptacle, 9, of approximately triangular cross section and just above it is mounted a receiving hopper, 10, into which the material flows from the chute, 7. In its receiving position as shown in Figure 1, the front and back walls, 11 and 12, respectively, of the hopper, 9, converge upwardly to the receiving mouth which registers with the discharge opening of the hopper, 10. The hopper, 9, is fitted with rockers, 13, which are preferably formed with teeth, 14, engaging apertures, 15, in horizontal supporting arms, 16. The supporting frame of which the arms, 16, are a part, includes vertical members, 17, rising from the vertical frame members, 18, of the loader vehicle, together with oblique braces, 19, anchored to the vehicle at 20, and a fabricated triangle of angle members, 21, 22 and 23, which serves to re-enforce each horizontal arm, 16, and also to support the receiving hopper, 10.

The rockers, 13, allow the hopper, 9, to turn through approximately 90 degrees and to effect this movement I provide cables, 24, attached to the lower forward corners of the hopper and extending around suitable drums on a winding shaft, 25. Said shaft is fitted with a gear, 26, meshing with a pinion, 27, on a short shaft, 28, which carries a sheave, 29, and operating chain, 30, by which hand power may be applied for tilting the hopper, 9, from receiving position to discharge position as shown in Figure 2. At the beginning of this movement, as the receiving mouth, 31, of the hopper, 9, moves past the strike off blade, 32, which is attached to the receiver, 10, the material in the hopper, 9, is leveled off and any excess material is thus pushed past the mouth, 31, onto the inclined front wall, 11, which being still downwardly inclined in the initial position of the hopper, 9, serves as a discharge chute by which the excess material is directed downwardly to a receiving chute, 33, which leads it into the lower boot, 34, of the return chute system and thus directs it toward the rotating disks, 5, by which it is returned in position to be picked up by the buckets, 4. The material, therefore, is not wasted, but is prevented from being discharged with the material which remains in the measuring hopper, 9.

The measuring hopper is provided with a tail gate, 35, having laterally projecting lugs, 36, which engage under guard flanges, 37, on the supporting frame when the hopper, 9, stands in receiving position, as in Figure 1. As the hopper is rocked toward discharge position, the lugs, 36, are lowered out of engagement with the flanges, 37, and the tail gate, 35, is thus free to swing open about its hinge axis, 38, so as to release the material in the hopper, 9. The tail gate is clearly seen in open position in Figure 3. When the hopper, 9, is returned to initial position after discharging its load, the lugs, 36, meet the outwardly flared ends, 39, of the flanges, 37, and are drawn under said flanges so that the tail gate is again locked in closed position when the hopper mouth, 31, is registered under the receiver, 10. This locked position of the tail gate is clearly shown in Figure 4.

For rocking the hopper, 9, from the position shown in Figure 2 back to its initial receiving position I provide cables, 40, which may be integral with cables, 24, and are attached near the upper corners of the hopper adjacent the receiving mouth, 31, and wind these cables about the same shaft, 25, which operates the cables, 24. Thus as the latter are wound up in tilting the hopper, 9 to dumping position, the cables, 40, are paid out to the extent shown in Figure 2, and by reversing the rotation of the shaft, 25, the cables, 40, are wound and cables, 24, are paid out by a corresponding amount. This keeps the hopper, 9, in control at all times and avoids unnecessary shock to the apparatus. Especially in working with concrete mixtures it is necessary to vary the proportions of sand and aggregate in making concrete for different purposes, and it is therefore desirable to vary the capacity of the measuring hopper, 9. For this purpose I provide a false bottom, 41, hinged at 42, near the tail gate, 35, and adapted to swing within the hopper so as to be secured by bolts at any one of the double series of holes, 43, provided in the side walls for that purpose. Owing to the triangular shape of the hopper body, the length of the false bottom must be altered according to its particular angular position, and this is taken care of by providing a slidably adjustable extension member, 44, at the free end of the part, 41. Clamping bolts engaging slots in the plate, 41, may be tightened to hold the extension plate, 44, at any position of adjustment.

As shown in Figures 1 to 4, the hopper, 9, discharges rearwardly of the loading machine, but in some situations it is desirable to have it discharge at one side of the machine. For this purpose the frame work which carries the horizontal supporting members, 16, may be attached to the vehicle frame, 18, at a vertical hinge axis, 45, as seen in Figure 5, so that after the measuring hopper, 9, has been filled through the receiver, 10, it may be tilted slightly to effect the "strike off" operation, and then the supporting frame work may be swung laterally about the axis, 45, to a position such as that shown in Figure 6, in which the hopper, 9, may be tipped over to discharging position and then returned to receiving position before the frame is swung back under the chute, 7. As will be noted, the receiving hopper, 10, is carried with the hopper, 9, when it is swung laterally, but in the process of striking off the hopper, 9, the material accumulated in the hopper, 10, is first discharged downwardly along the inclined wall, 11, of the measuring hopper so that this material is not wasted or scattered during the discharge of the hopper, 9.

The mounting of the hopper, 9, so that it can be swung about the hinge axis, 45, is also useful when it becomes necessary to lower the boom of the loader by tilting it, as indicated in dotted lines on Figure 1. Frequently in transporting a machine from one job to another, its height must be reduced to remove it under a viaduct or bridge or through the archway of a building leading to a material yard or the like, in which cases the hopper, 9, can be swung out of the way to one side of the machine so as to permit swinging the boom downwardly into the space normally occupied by the hopper.

I claim:—

1. The combination of a measuring hopper tiltably mounted, a receiver above said hopper in position to direct material into the same, means for tilting the measuring hopper for dumping its contents, said hopper having a wall which extends in inclined position under the receiver during the dumping movement for deflecting material flowing from the receiver.

2. In combination with a loading machine, a measuring hopper tiltably mounted, a receiver above said hopper in position to direct material from the loader into the hopper, means for tilting the measuring hopper for dumping its contents, said hopper having a wall which extends in inclined position under the receiver during the dumping movement, and a loading machine comprising an endless inclined load-carrying member with a return chute extending thereunder from a point adjacent said inclined wall of the hopper downwardly toward the receiving end of the loader.

3. In a measuring hopper tiltably mounted having a receiving opening at its upper end and a discharge opening at the bottom thereof, a gate normally closing said discharge opening, a false bottom in said hopper adjustable to a plurality of positions for varying the capacity of the hopper.

4. In a measuring hopper tiltably mounted and having a receiving opening at its upper side, and a discharge opening adjacent its bottom wall at one side thereof a gate on said hopper normally closing the discharge opening, a false bottom pivoted on a horizontal axis adjacent the discharge opening and adjustable about said axis for varying the capacity of the hopper.

5. In the combination defined in claim 4, said false bottom having a slidably extensible portion adjustable for fitting into contact with the wall at the side opposite the discharge opening.

6. A measuring hopper comprising substantially vertical side walls and three transverse walls connecting them in approximately triangular relation to each other, a receiving opening from which two of said walls slope in opposite directions when the hopper is in receiving position, said hopper being mounted for tilting and having a discharge opening between one of said sloping walls and the third or bottom wall.

7. In the combination defined in claim 6, a receiver normally positioned above the receiving opening of the hopper and past which one of said sloping walls moves in the tilting, together with a return chute toward which material is directed over said sloping wall as the hopper is tilted.

8. In combination with a loading machine comprising an inclined bucket elevator, a measuring hopper and a horizontal track therefor disposed under the upper end of the loader, said hopper having rockers arranged to roll on the track for tilting the hopper from receiving position to discharge position, a winding drum and a cable thereon having its opposite ends connected respectively to an upper and a lower portion of the hopper whereby rotation of the drum effects the rocking movement of the hopper.

9. In combination with a loading machine comprising an endless inclined load-carrying member, a receiving hopper disposed under the upper end of said member, a measuring hopper into which the receiving hopper discharges by gravity, said measuring hopper being tiltably mounted for discharge, a horizontally extending frame supporting both hoppers and hinged to swing about a vertical pivot for discharging at one side of the loading machine, said measuring hopper being mounted for tilting away from the hinge axis and having an inclined wall sloping downwardly toward said axis and toward the loading member of the machine, said wall swinging under the receiving hopper in the initial portion of the tilting movement of the measuring hopper for deflecting material flowing from the receiving hopper during the discharge interval and a return chute extending under the loading member to receive such deflected material and direct it toward the loading end of the machine.

10. In a measuring hopper having a receiving opening and a discharge opening, a tail gate for the latter, a strike-off blade arranged to co-operate with the receiving opening for leveling the material and means for holding the tail gate closed during such leveling operation of the strike-off blade.

11. In a measuring hopper having an upwardly opening receiving mouth and a discharge opening in the lower portion of the hopper, said hopper being tiltably mounted, a fixed strike-off blade past which the receiving mouth moves in the initial portion of the tilting movement and a closure for the discharge opening arranged to prevent discharge therethrough during said initial portion of the tilting movement.

12. In the combination defined in claim 11, said closure being a tail gate hinged to the hopper, a lug on said gate and a fixed cam which engages said lug during the initial portion of the tilting movement of the hopper for holding the tail gate closed and from which said lug escapes by further tilting of the hopper after completion of the strike-off operation.

13. The combination with a measuring hopper, of means for supporting the same for tilting movement, a receiver above said hopper in position to direct material to said hopper, means for tilting the measuring hopper for discharging its contents, a strike off blade carried by the receiver for levelling off the contents of the hopper as it tilts past the blade said hopper having a wall which extends in inclined position under the receiver during the tilting of the hopper for directing the material levelled off by the strike off blade.

14. In a loading machine, a measuring hopper, means for supporting said hopper for tilting movement, means for tilting the hopper for discharging its contents, a tail gate for the discharge opening hinged on a horizontal axis at its upper edge and depending therefrom when the hopper stands in receiving position, a lug on said gate and a fixed member with respect to which the hopper moves in tilting for discharge, said member engaging said lug for holding the gate closed while the hopper remains in receiving position.

15. In an apparatus of the class described, a measuring hopper, means for supporting said hopper for tliting movement, means for tilting said hopper a tail gate upon said hopper means for holding said gate in closed position while said hopper is in receiving position and means whereby said gate is released for opening movement upon a tilting movement of said hopper toawrds discharging position.

16. The combination with a loading machine, of a measuring hopper for receiving material from said loading machine, means for supporting said hopper for tilting movement, a discharge gate on said hopper, and means for normally maintaining said gate in closed position, and for releasing said gate for opening movement upon a tilting movement of said hopper to discharging position.

17. In an apparatus of the class described, a measuring hopper, means for supporting said hopper for tilting movement, a discharge gate on said hopper, said discharge gate having laterally extending lugs, and means in the path of said lugs for holding said gate in closed position, when said hopper is in a predetermined position, and for releasing said gate when said hopper is moved from said predetermined position.

18. In a loader, a measuring device adapted for receiving material from the loader, means for supporting said measuring device for tilting movement, means for tilting said measuring device to and fro, a strike off plate for leveling said measuring device during its tilting movement, means for directing the spillage from said measuring device to said loader, a discharge gate on said measuring device, and means for opening and closing said discharge gate during the tilting movement of said measuring device.

HARRY H. BARBER.